(12) United States Patent
Falkenstein

(10) Patent No.: US 8,974,348 B2
(45) Date of Patent: Mar. 10, 2015

(54) METHOD AND DEVICE FOR OPERATING A HYBRID VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 326 days.

(21) Appl. No.: 13/511,604

(22) PCT Filed: Sep. 28, 2010

(86) PCT No.: PCT/EP2010/064311
§ 371 (c)(1),
(2), (4) Date: Oct. 4, 2012

(87) PCT Pub. No.: WO2011/064018
PCT Pub. Date: Jun. 3, 2011

(65) Prior Publication Data
US 2013/0035201 A1  Feb. 7, 2013

(30) Foreign Application Priority Data

Nov. 24, 2009 (DE) .......................... 10 2009 047 052

(51) Int. Cl.
| | | |
|---|---|---|
| B60W 10/02 | (2006.01) | |
| B60W 10/04 | (2006.01) | |
| B60W 10/06 | (2006.01) | |
| B60W 10/08 | (2006.01) | |
| B60W 10/113 | (2012.01) | |
| B60W 30/192 | (2012.01) | |
| B60W 20/00 | (2006.01) | |

(52) U.S. Cl.
CPC ............... *B60W 10/02* (2013.01); *B60W 10/06* (2013.01); *B60W 10/08* (2013.01); *B60W 10/113* (2013.01); *B60W 30/192* (2013.01); *B60W 20/00* (2013.01); *B60W 2510/0258* (2013.01); *B60W 2710/025* (2013.01); *B60Y 2400/428* (2013.01); *Y02T 10/6286* (2013.01)
USPC ................................ 477/176; 477/5; 477/180

(58) Field of Classification Search
USPC ............. 477/5–8, 70, 77, 79, 80, 83, 84, 107, 477/166, 167, 174–176, 180, 181; 903/912, 903/930, 946; 180/65.21, 65.25, 65.26, 180/65.285
See application file for complete search history.

(56) References Cited

U.S. PATENT DOCUMENTS

| | | | | |
|---|---|---|---|---|
| 2005/0101432 A1* | 5/2005 | Pels et al. | ............................ | 477/5 |
| 2007/0056783 A1* | 3/2007 | Joe et al. | ........................ | 180/65.2 |
| 2007/0056784 A1* | 3/2007 | Joe et al. | ........................ | 180/65.2 |
| 2007/0221421 A1* | 9/2007 | Tanishima | .................... | 180/65.2 |
| 2007/0275819 A1* | 11/2007 | Hirata | ................................. | 477/5 |
| 2007/0278022 A1* | 12/2007 | Tanishima | .................... | 180/65.2 |
| 2010/0248893 A1* | 9/2010 | Shimanaka | ......................... | 477/5 |

FOREIGN PATENT DOCUMENTS

WO    WO 2004111441 A1 *  12/2004   .............. F02N 11/08

* cited by examiner

*Primary Examiner* — Justin Holmes
(74) *Attorney, Agent, or Firm* — Kenyon & Kenyon LLP

(57) ABSTRACT

A method for operating a hybrid vehicle, having at least one first drive unit and one second drive unit, the second drive unit being started by at least one portion of the drive torque provided by the first drive unit in that the clutch situated between the first drive unit and the second drive unit is brought from a disengaged state into a slipping state. To improve the driving comfort of the hybrid vehicle during a start or a stop of the internal combustion engine, at least two clutches are shifted into the slipping state for starting the second drive unit.

17 Claims, 2 Drawing Sheets

METHOD AND DEVICE FOR OPERATING A HYBRID VEHICLE

FIELD OF THE INVENTION

The present invention relates to a method for operating a hybrid vehicle having at least one first and one second drive unit, in which the second drive unit is started by at least one portion of the drive torque provided by the first drive unit, a clutch situated between the first drive unit and the second drive unit being brought from a disengaged state to a slipping state, and a device for implementing this method.

BACKGROUND INFORMATION

Vehicles having a hybrid drive structure have an internal combustion engine and another drive unit which may be designed as an electric motor or as a hydraulic motor. The drive torque may thus be provided either by both drive units or by only one drive unit while the hybrid vehicle is in driving operation.

The internal combustion engine is started during electric driving operation of the hybrid vehicle by a connection to a drive train, which is driven by the electric motor. The need for starting the internal combustion engine arises, for example, when the driver wants more power than the electric motor is able to deliver or when the energy level of an energy storage which supplies electric power to the electric motor has dropped too much.

A starting torque or a starting power required for starting the internal combustion engine must be provided by the additional drive unit, for example, the electric motor, this power being transmitted to the internal combustion engine via a slipping clutch. A clutch operated in slipping mode has inaccuracies. Such inaccuracies include varying coefficients of friction of the clutch linings due to wear or changes in temperature, hydraulic or mechanical deviations in the operating system of the clutches or in hystereses, signal transit times and aging phenomena during the activation. The clutch torque transmitted by the clutch operated in slipping mode is not known exactly and cannot be adjusted accurately. This prevents accurate compensation of the starting torque or the starting power of the internal combustion engine by the additional drive unit. As a result, the uncompensated component acts as interference upon the drive train, which excites rotational vibrations and is perceived as jerking of the vehicle, which has a negative effect on the driving comfort.

SUMMARY OF THE INVENTION

The method according to the present invention for operating a hybrid vehicle having the features described herein has the advantage that extensive compensation of the starting torque or the starting power of the internal combustion engine takes place and thus the driving comfort of the hybrid vehicle is improved during a start or a stop of the internal combustion engine. Due to the fact that at least two clutches are shifted to the slipping state to start the second drive unit, the effects of starting the internal combustion engine on the drive train are reduced. This compensation relates not only to an acceleration torque or a breakaway torque which is necessary at the start of the second drive unit in the form of an internal combustion engine for overcoming the static friction or mixed friction at a low oil pressure as a function of the temperature at the parking time. An internal combustion engine torque, which occurs with the first ignitions of the internal combustion engine and in most cases is only inaccurately adjustable, is reduced in its effect on the drive train through the use of two clutches operated in slipping mode.

Slippage of a clutch is understood to refer to a condition of the clutch in which the rotational speed prevailing at the input of the clutch is not equal to the rotational speed delivered by the clutch at the output, while the input side and the output side of the clutch are in frictional contact with one another.

The two clutches are advantageously shifted successively into the slipping state. The second drive unit is gradually brought to the rotational speed at which it is capable of operating independently.

Alternatively, the two clutches are shifted sequentially superposed into the slipping state. This prevents sudden jumps in the transmission of the clutch torque and ensures continuous cranking of the second drive unit. If multiple clutches are operated in slipping mode at the same time, the result is a lower power loss per clutch, i.e., each clutch has less wear, which is why clutches of small dimensions are usable. The heat generated by friction is distributed over the various clutches.

In one embodiment, the clutches have different separate frictions during sole start or acceleration of the second drive unit. Hereinafter, the friction is referred to below as a separate friction which occurs on this clutch momentarily at the start or at the acceleration of the second drive unit merely due to only one clutch being operated in slipping mode. The torque to be transmitted by this clutch depends on the total torque required for starting and accelerating the second drive unit and depends on the gear ratios. The separate friction changes with the rotational speeds, in particular also with the instantaneous rotational speed of the second drive unit.

The torques transmitted by the multiple clutches operated in slipping mode may be compensated together or additionally provided by the first drive unit. The effective directions of the torques transmitted by the clutches operated in slipping mode must be taken into account here.

The friction generated by a clutch operated in slipping mode is obtained from the product of the absolute value of the differential angular velocity and the absolute value of the torque transmitted by the clutch operated in slipping mode. The differential angular velocity is the difference in the angular velocities between the input side and the output side of the clutch operated in slipping mode.

The differential angular velocity depends on the rotational speeds of the first and second drive units or the rotational speeds in the output side and the gear ratios. In addition to the torque or power for cranking or accelerating the second drive unit, the first drive unit must also provide the friction, which is converted into heat by the slipping state of the clutch. The two components yield a compensation power which is to be provided by the first drive unit.

Due to the different separate frictions of the clutches, it is possible that the clutch which has currently the lowest separate friction for cranking the second drive unit is operated in slipping mode and accelerates the second drive unit. This permits continuous cranking of the second drive unit with minor negative effects on the output side and driving comfort of the hybrid vehicle and low compensation power to be provided by the first drive unit.

To accelerate the second drive unit, the output rotational speed of the output side of the clutch connected to the output side of the hybrid vehicle must be in a slipping state above the input rotational speed of the input side connected to the second drive unit.

In one refinement of the present invention, for cranking the second drive unit that clutch is operated in slipping mode, which accelerates the second drive unit and thus has currently the lowest separate friction. Thus for breaking away and overcoming the first compressions of the second drive unit, a high torque transmission from the first drive unit to the output side of the clutch prevails because the cylinders of an internal combustion engine which compress first directly after the cranking require a higher starting torque. The first drive unit may have smaller dimensions, or a reserve torque required for the start of the second drive unit may be selected to be lower. A lower friction results in a lower heat input and wear, which has a positive effect on the lifetime of the clutches.

In another specific embodiment, the clutch, which is initially operated in slipping mode for starting the second drive unit, does not accelerate the second drive unit up to its idling speed. Yet before the second drive unit has reached its idling speed, there is a change of sign in the difference in the rotational speeds between the input side and the output side of the clutch, which is initially operated in slipping mode. The sign of the torque transmitted by the clutch in slipping mode thus also changes.

After successful cranking of the second drive unit, the clutch which is initially operated in slipping mode during the start of the second drive unit is advantageously disengaged again while the other clutch is operated in slipping mode. When using multiple clutches, it is advantageous if, with an increase in rotational speed of the second drive unit during the start, the clutch which is accelerating the second drive unit and therefore has the lowest separate friction is always successively operated in slipping mode.

In one embodiment, on reaching an equal rotational speed between the input side as at the output side of a clutch being operated in slipping mode, this is at least partially disengaged from the slipping mode. With a change in the sign of the difference in rotational speeds between the input side and the output side of the clutch, this yields a change of sign and thus a jump in the torque transmitted by the clutch in the slipping mode.

When the second drive unit has reached normal operation and is operating on its own power, there is a marked acceleration or an increase in the rotational speed of the second drive unit, which results in a change in the sign of the difference between the input rotational speed and the output rotational speed, because now the torques provided by the first and second drive units are additive. This jump at the sign change of the torque transmitted by the slipping clutch is minimized or entirely prevented by partial or complete disengagement of the clutch because the friction contacts existing between the two clutch disks and thus their operative connection are cancelled again at complete disengagement of the clutch.

In one refinement, to detect the end of the start at the at least partially disengaged clutch, the rotational speed of the second drive unit is evaluated. From the end of the start, the second drive unit need no longer be dragged and is providing output on its own power.

Another refinement of the present invention relates to a method for operating a hybrid vehicle having at least one first drive unit and one second drive unit, the second drive unit being stopped by at least one portion of the drive torque provided by the first drive unit, in that a clutch situated between the first and second drive units is brought from the engaged state into a slipping state. To support stopping of the second drive unit by providing an additional torque and thus to improve the driving comfort of the hybrid vehicle at a stop of the internal combustion engine, at least two clutches are shifted into the slipping state to stop the second drive unit. This has the advantage that the rotational speed of the second drive unit is ramped down continuously by a torque transmitted by a clutch in the slipping state. The second drive unit is stopped more quickly. Kinetic energy of the coasting second drive unit is utilized to propel the vehicle. By influencing the torque transmitted by the clutch in the slipping state, irregularities in the rotational speed of the second drive unit are reduced during coasting, e.g., due to individual compressions. This takes place, for example, in that irregularities in the rotational speed of the second drive unit are taken into account during activation of a clutch and affect the torque transmitted by a clutch in the slipping state. Vibrations or "shaking" of the vehicle may be minimized in this way and the driving comfort may be increased in particular when the first drive unit compensates for the torques instantaneously transmitted by the slipping clutches.

The two clutches are advantageously shifted successively or sequentially superposed into the slipping state. This prevents sudden jumps in the transmission of the clutch torque and ensures a continuous slowdown of the second drive unit. The second drive unit is gradually brought to the desired slower rotational speed in this way.

In one embodiment, after a clutch has been brought from the engaged state into a slipping or disengaged state, as an additional step, the clutch currently having the lowest separate friction and decelerating the second drive unit is initially operated in slipping mode. The second drive unit is decelerated continuously in this way. Heat input and clutch wear are low.

The second drive unit may also be stopped by using multiple clutches, whereby, after one clutch has been brought from the engaged state into a slipping or disengaged state, the clutch which decelerates the second drive unit using the currently lowest separate friction is always the clutch which is operated in slipping mode.

Another refinement of the present invention relates to a device for operating a hybrid vehicle, having at least one first drive unit and one second drive unit, in which the second drive unit is started or stopped by at least a portion of the drive torque provided by the first drive unit, in that a clutch situated between the first drive unit and the second drive unit is brought from the disengaged or engaged state into a slipping state. To improve the driving comfort of the hybrid vehicle during a start or a stop of the internal combustion engine, an arrangement is provided which shifts at least two clutches into the slipping state for a start or a stop of the second drive unit. This has the advantage that the effects of the start or the stop of the second drive unit on the drive train in the form of rotational vibrations are reduced and jerking of the hybrid vehicle is suppressed.

The first drive unit is advantageously situated on a first sub-transmission of a dual-clutch transmission having two sub-transmissions and the second drive unit to be started or stopped is connected to the output of the hybrid vehicle via the dual-clutch transmission. Starting and stopping of the second drive unit may be carried out particularly easily with the aid of dual-clutch transmissions known per se.

In one embodiment, the first and second drive units, the at least two clutches and a sensor detecting the rotational speed of the second drive unit are connected to a control unit for controlling the sequences of the clutches for a start or a stop of the second drive unit. This control unit may influence the amount of clutch torque instantaneously transmitted by the clutch in the slipping state and by disengaging and engaging the clutch or by varying the contact force of the clutch linings. Whether the second drive unit is started or stopped depends on the effective direction of the instantaneously transmitted clutch torque and thus depends on the sign of the difference between the input rotational speed and the output rotational speed of the clutch.

The control unit is advantageously connected to a shift unit which shifts the gear ratio on the clutch not being operated in slipping mode, this shift unit being situated on at least one countershaft of each sub-transmission. With the aid of this shift unit, the gear ratio is changed on the countershaft connected to the clutch which is not in slipping mode at the time of shifting. It is thus possible to reliably rev up the second drive unit by alternately applying a lower gear ratio to the clutches by operating one clutch in slipping mode and shifting the other clutch to a different gear ratio. The clutch having the higher gear ratio is subsequently operated in slipping mode, while the first clutch is acted upon by a new gear ratio.

In one refinement, the first drive unit is designed as an electric motor and the second drive unit is designed as an internal combustion engine. This configuration makes it possible to retain the functionality of electric driving because electric driving permits both user-friendly driving function and fuel savings.

The present invention allows numerous specific embodiments. One of these will now be explained in greater detail on the basis of the figures in the drawings.

DETAILED DESCRIPTION

Figure 1:
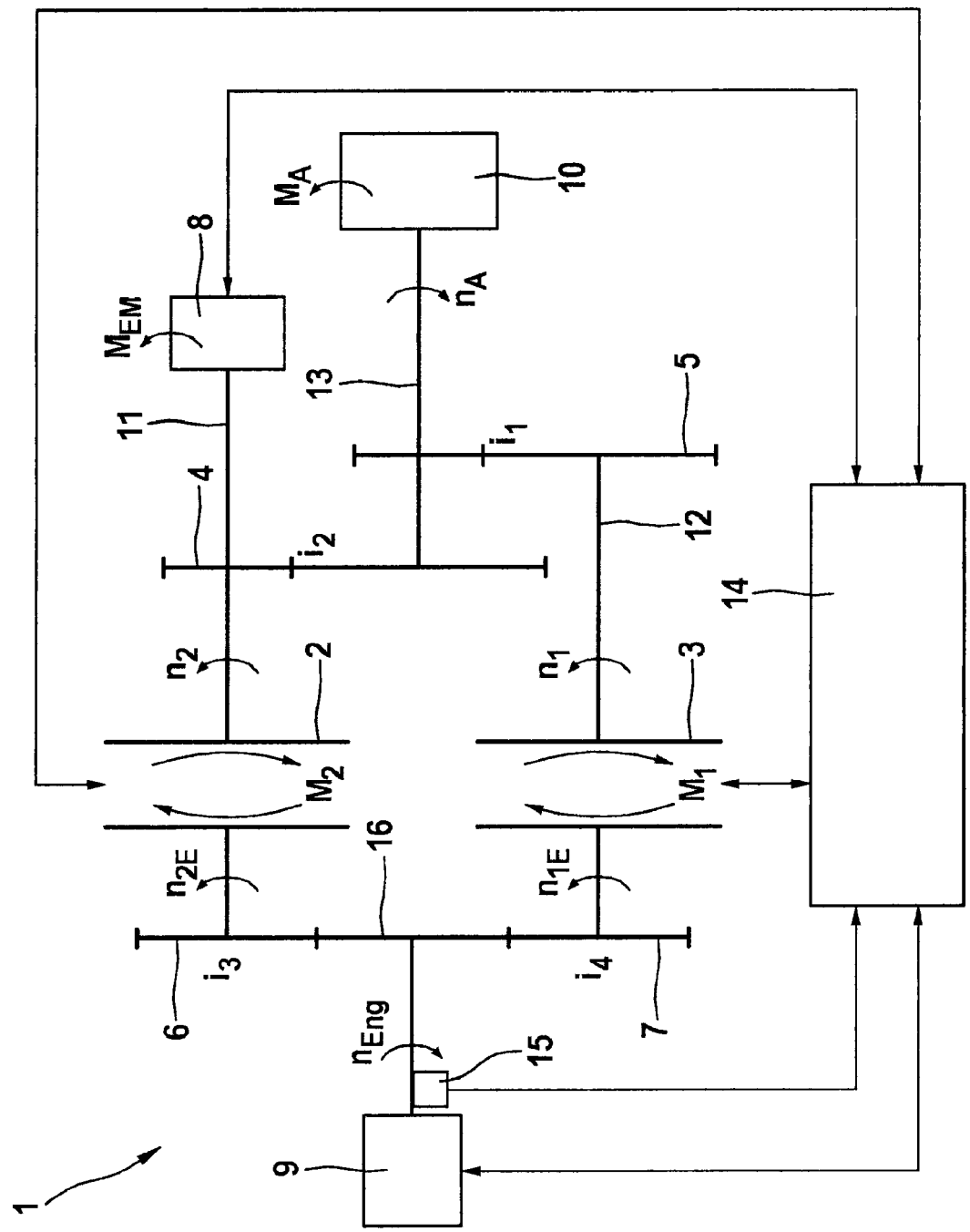
FIG. 1 shows a schematic diagram of a drive train of a hybrid vehicle having a dual-clutch transmission.

FIG. 1 shows an essentially known drive train 1 of a hybrid vehicle having a dual-clutch transmission 2, 3, 4, 5, 6, 7, 11, 12. An electric motor 8 and an internal combustion engine 9 are situated on dual-clutch transmission 2, 3, 4, 5, 6, 7, 11, 12, which connects electric motor 8 and internal combustion engine 9 to the drive wheels (not shown here) of vehicle 10.

Dual-clutch transmission 2, 3, 4, 5, 6, 7, 11, 12 has two branches, the first branch including a first clutch 2 and a first countershaft 11 of dual-clutch transmission 2, 3, 4, 5, 6, 7, 11, 12.

The second branch of dual-clutch transmission 2, 3, 4, 5, 6, 7, 11, 12 contains a second clutch 3, which leads to a second countershaft 12 of dual-clutch transmission 2, 3, 4, 5, 6, 7, 11, 12.

The countershaft is understood to be a shaft on which the force flow runs from one drive shaft and back to an output shaft.

Odd-numbered gears, e.g., 1, 3, 5, 7, are provided on first countershaft 11 while even-numbered gears 2, 4, 6 are provided on second countershaft 12. After a gear has been engaged, the next gear may already be shifted on the inactive shaft. The gear is changed quickly by shifting the two countershafts 11, 12 with the aid of clutches 2 and 3.

Internal combustion engine 9 is connected to the input sides of both first and second clutches 2, 3 via a gear wheel 16 which engages in two other gear wheels 6, 7. Since for the sake of simplicity, gear ratios $i_3$ (gear wheels 16, 6) and $i_4$ (gear wheels 16, 7) are both assumed to be 1, $$i_3 = i_4 = 1 \tag{1},$$

the input sides of clutches 2, 3 rotate at rotational speeds $n_{2E}$ and $n_{1E}$ corresponding to rotational speed $n_{Eng}$ of internal combustion engine 9:

$$n_{2E} = n_{1E} = n_{Eng} \tag{2}.$$

Electric motor 8 is connected to one of the two countershafts 11, 12. In the present case, they are connected to first countershaft 11, which carries the odd-numbered gears. Due to this configuration, internal combustion engine 9 may be operated in certain operating states in a different gear, e.g., an even-numbered gear, than electric motor 8 for which an odd-numbered gear has been engaged. Electric motor 8 is therefore operated in a range, which is favorable in terms of efficiency and differs from the efficiency-optimized range of internal combustion engine 9.

The output sides of both clutches 2, 3 are connected to both countershafts 11, 12, which act on output shaft 13 via gear stages 4, 5 at gear ratios $i_2$, $i_1$ and drive the drive wheels (not shown) in vehicle 10. FIG. 1 shows only two gear ratios or two gears for the sake of simplicity. Multiple shiftable gear stages are used in the general case.

The following equation holds for a rotational speed $n_1$ of countershaft 12 and the output side of clutch 3, and rotational speed $n_A$ of output shaft 13

$$n_A = n_1 / i_1 \tag{3}.$$

The following equation holds for the relationship between rotational speed $n_2$ of countershaft 11 and the output side of clutch 2 and rotational speed $n_A$ of output shaft 13:

$$n_A = n_2 / i_2 \tag{4}.$$

As shown in FIG. 1, a lower gear (e.g., the first gear) is applied to countershaft 11, while a higher gear, e.g., the second gear, is applied to countershaft 12. The (positive) values of gear ratios $i_1$, $i_2$ behave in the inverse manner:

$$i_2 > i_1 \tag{5}.$$

Equations (3), (4) and (5) show that countershaft 12 rotates more slowly than countershaft 11, which would mean that $$n_1 < n_2 \tag{6}.$$

A control unit 14 is connected to clutches 2, 3 for controlling these clutches. Control unit 14 also leads to electric motor 8 and internal combustion engine 9. A rotational speed sensor 15 is situated at the output of internal combustion engine 9 and measures rotational speed $n_{Eng}$ of internal combustion engine 9, which is relayed to control unit 14. Additional sensors (not shown) measure rotational speeds $n_1$, $n_2$ of countershafts 12, 11 or additional signals which allow rotational speeds $n_1$, $n_2$ of countershafts 12, 11 to be deduced and forward these signals to control unit 14.

In hybrid driving, one of two clutches 2, 3 is disengaged while the other clutch 2, 3 is engaged. For example, if clutch 3 is engaged, internal combustion engine 9 acts at gear ratio $i_1$ on output shaft 13 and thus on vehicle 10. It then holds that $$n_1 = n_{1E} = n_{Eng}$$

and with equation (3):

$$n_A = n_1 / i_1 = n_{Eng} / i_1$$

Electric motor 8, which is connected to countershaft 11, rotates at rotational speed $n_{Em}$ which corresponds to rotational speed $n_2$ of countershaft 11 and generates a torque $M_{EM}$. In purely electrical operation, internal combustion engine 9 is decoupled because both clutches 2, 3 are disengaged. Internal combustion engine 9 is not in operation, whereby it holds that $n_{Eng}=0$ U/min. Electric motor 8 drives vehicle 10, and the following holds with equation (4) for the rotational speeds:

$$n_2 = n_{EM} \qquad (5)$$

$$n_A = n_2/i_2 = n_{Em}/i_2.$$

Engine torque $M_A = M_{EM} \times i_2$ is available for propelling vehicle 10. In the exemplary embodiment, efficiencies of $\eta=1$ are assumed for the sake of simplicity.

Internal combustion engine 9 is then started during electric driving in that clutches 2 and/or 3 are brought from the disengaged state to the slipping state. A friction clutch 2, 3 is in slipping mode when the rotational speed on the input side of the clutch is different from the rotational speed on the output side of the clutch, whereby the two clutch disks are in frictional contact with one another.

In the slipping state, clutch 3 transmits a clutch torque $M_1$ and clutch 2 transmits a clutch torque $M_2$. Friction $P_{R1}$, $P_{R2}$ generated by a clutch 3, 2 operated in slipping mode is obtained from the product of the differential angular velocity between the input side and the output side and the value of clutch torque $M_1$ and $M_2$ instantaneously transmitted in the slipping state. The following equation holds for friction $P_{R1}$ of clutch 3:

$$P_{R1} = \pi/30 \times |n_1 - n_{1E}| \times |M_1| \qquad (7),$$

and for friction $P_{R2}$ of clutch 2:

$$P_{R2} = \pi/30 \times |n_2 - n_{2E}| \times |M_2| \qquad (8).$$

For starting internal combustion engine 9, a starting torque $M_S$, which starts and accelerates internal combustion engine 9, is necessary.

The friction prevailing momentarily on this clutch 3 or 2 at the start or acceleration of internal combustion engine 9 due only to only one clutch 3 or 2 being operated in slipping mode is referred to below as separate friction $P_{RS1}$, $P_{RS2}$. Due to only clutch 3 being operated at the start, based on equation (1)

$$M_1 = M_S \qquad (9)$$

and equations (2), (7) for separate friction $P_{RS1}$ of clutch 3, it holds that $$P_{RS1} = \pi/30 \times |n_1 - n_{Eng}| \times |M_S| \qquad (10).$$

The following holds at the start due only to clutch 2 based on equation (1)

$$M_2 = M_S \qquad (11)$$

and with equations (2), (8) for separate friction $P_{RS2}$ of clutch 2, it holds that $$P_{RS2} = \pi/30 \times |n_2 - n_{Eng}| \times |M_S| \qquad (12).$$

With other active principles of the clutches, e.g., in non-contact eddy current clutches, instead of separate friction, the separate power loss must be taken into account.

To accelerate internal combustion engine 9 via slipping clutch 3, output rotational speed $n_1$ of the output side connected to the output must be above input rotational speed $n_{1E} = n_{Eng}$.

To accelerate internal combustion engine 9 via slipping clutch 2, output rotational speed $n_2$ of the output side connected to the output must be above input rotational speed $n_{2E} = n_{Eng}$.

If both clutches 2 and 3 are brought from the disengaged state to the slipping state at the start of internal combustion engine 9, then the following relationship holds between clutch torques $M_1$ and $M_2$ instantaneously transmitted in the slipping states of clutches 3, 2 and starting torque $M_S$ of internal combustion engine 9:

$$M_S = M_1 + M_2 \qquad (13).$$

A torque balance for output shaft 13 yields the following relationship:

$$(M_{EM} - M_2) \times i_2 = M_A + M_1 \times i_1$$

or $$M_{EM} \times i_2 = M_A + M_1 \times i_1 + M_2 \times i_2 \qquad (14)$$

or $$M_{EM} = M_A/i_2 + M_1 \times (i_1/i_2) + M_2 \qquad (15)$$

As already explained, a certain starting torque $M_S$ of internal combustion engine 9 is necessary. To generate this it is initially supplied via clutch 3, i.e., according to equation (1) $M_1 = M_S$ is selected. Clutch 2 initially remains disengaged, i.e., $M_2 = 0$ Nm. As equation (15) shows, in the transition from disengaged clutch 3 to the latter operated in slipping mode, electric motor 8 must generate an additional compensation torque component in the amount of $M_1 \times (i_1/i_2)$ or $M_S \times (i_1/i_2)$ in order to keep engine torque $M_A$ constant. According to equation (5), additional compensation torque component $M_1 \times (i_1/i_2)$ is lower than clutch torque $M_1$ or starting torque $M_S$ instantaneously transmitted by clutch 3 in slipping mode.

If only clutch 2 were initially used, then according to equation (1), a clutch torque of $M_2 = M_S$ would have to be selected in the slipping state. According to equation (15), electric motor 8 would then have to generate an additional compensation torque component in the amount of $M_2$ or $M_S$ in the transition from disengaged clutch 2 to the latter operated in slipping mode.

It is more advantageous to initially provide starting torque $M_S$ of internal combustion engine 9 via clutch 3, the additional compensation torque component $M_S \times (i_1/i_2)$ which is required turns out to be lower according to equation (5).

Of all the clutches capable of accelerating internal combustion engine 9, i.e., whose prevailing output rotational speed is instantaneously above the prevailing input rotational speed, it is favorable in the general case to use the clutch having the lowest separate friction at the moment. Electric motor 8 must provide power $P_s$ required for the start, i.e., for cranking and accelerating internal combustion engine 9 according to the equation $$P_S = \pi/30 \times n_{Eng} \times M_S \qquad (16)$$

and additionally to provide the friction of the slipping clutch. The clutch with the lowest separate friction therefore may be preferred.

There is the possibility that both clutches 3, 2 will be able to accelerate the internal combustion engine if output rotational speed $n_1$ of clutch 3 is above input rotational speed $n_{1E}$ $$n_1 > n_{1E}.$$

With equations (2), (6), it then holds that $$n_2 > n_1 > n_{1E} = n_{2E} = n_{Eng} \qquad (17).$$

According to equations (10) and (12), separate friction $P_{RS1}$ of clutch 3 is lower than separate friction $P_{RS2}$ of clutch 2. As a result, the heat input and clutch wear are also lower at the lower friction if clutch 3 is active initially for cranking internal combustion engine 9. When clutch torques $M_1$ and $M_2$ are equally large according to equations (9) and (11), a lower differential rotational speed is present at clutch 3.

According to equations (5) and (14), clutch torque $M_1$ instantaneously transmitted by clutch 3 has less effect on engine torque $M_A$ because of a lower gear ratio $i_1$ than clutch torque $M_2$ instantaneously transmitted by clutch 2. Inaccuracies in clutch torques $M_1$, $M_2$, which result in inaccurate compensation of starting torque $M_S$ via electric motor 8, have less effect on the output if clutch 3 is used. According to equation (7), an inaccuracy in clutch torque $M_1$ of clutch 3 has a lesser effect on friction $P_{R1}$ of clutch 3 than the effect of the same inaccuracy in clutch torque $M_2$ of clutch 2 on friction $P_{R2}$ of clutch 2 according to equation (8). Rotational speed ratios according to equation (17) are presupposed. With a lower effect of an inaccuracy on the friction, this also yields a lower negative effect on the output and thus on the driving comfort when clutch 3 is used.

Figure 2:
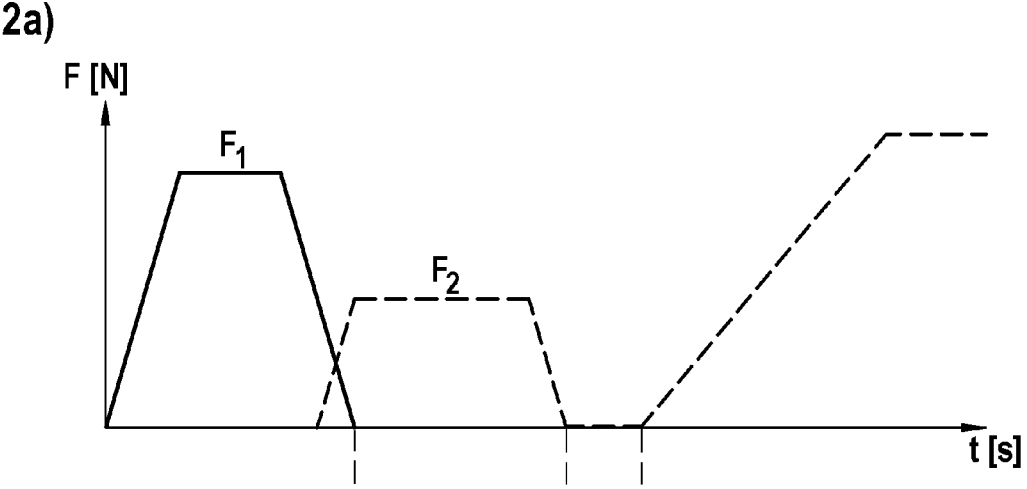
FIG. 2 shows the starting sequence of an internal combustion engine in a hybrid vehicle when using the clutches of the dual-clutch transmission.
Figure 2:
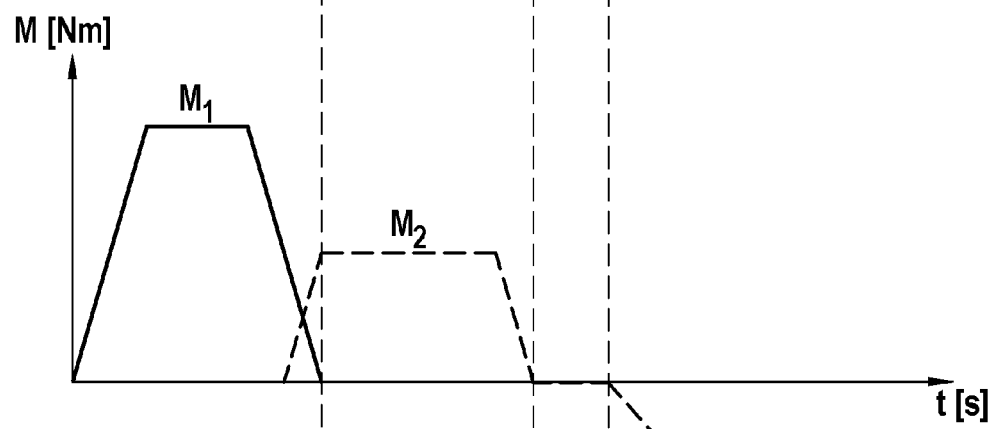
Figure 2:
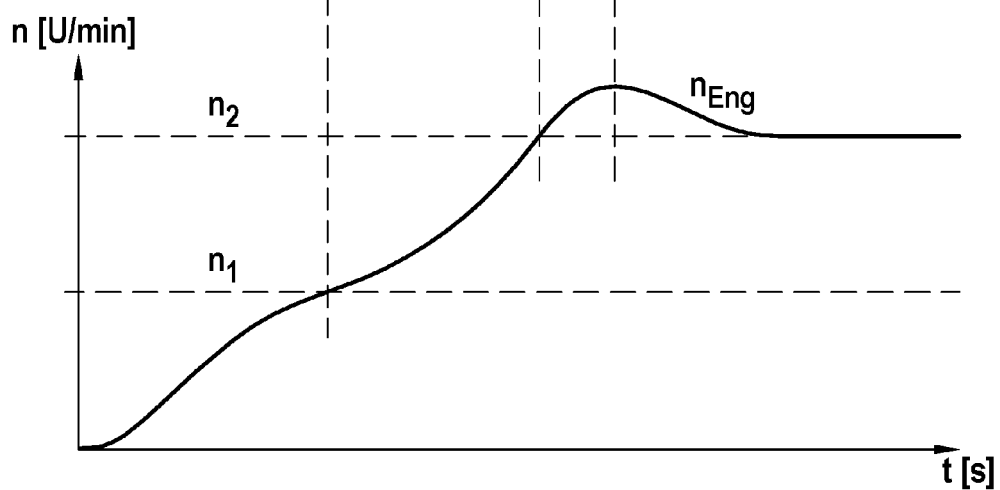

FIG. 2 shows the sequence of a start of the internal combustion engine in a hybrid vehicle. FIG. 2a shows contact force $F_2$ for the friction linings of clutch 2 and contact force $F_1$ for the friction linings of clutch 3 as a function of time t. Resulting clutch torques $M_2$, $M_1$ which result from this and are instantaneously transmitted in slipping operation as a function of time t are shown in FIG. 2b, whereas FIG. 2c shows rotational speeds $n_{Eng}$ of internal combustion engine 9 and $n_1$ and $n_2$ of countershafts 12 and 11. Control unit 14 initially shifts disengaged clutch 3 into slipping mode, so that internal combustion engine 9 is cranked at a favorable torque ratio. Clutch 3 is again completely disengaged until reaching the rotational speed equality $n_{Eng}=n_1$ to avoid a torque jump at the sign change for the difference between the input and output rotational speeds. Clutch 2 is engaged simultaneously with the disengagement of clutch 3, clutch 2 being also brought from a disengaged state into a slipping state but not being engaged completely. The slipping state of clutch 2 in the direction of re-disengagement of the clutch then takes place until reaching the rotational speed equality of input rotational speed $n_{Eng}$ and output rotational speed $n_2$ of clutch 2. Clutch 2 is again fully disengaged when $n_{Eng}=n_2$. Since both clutches 2, 3 are disengaged at this point in time, rotational speed $n_{Eng}$ of internal combustion engine 9 may overshoot due to the initial combustions without any negative effects on output shaft 13 due to a sudden torque change. Clutch 2 is then returned into the slipping state, so that internal combustion engine 9 feeds a torque into output shaft 13. When the rotational speeds are equal to rotational speed $n_{Eng}$ of the internal combustion engine at the input side of clutch 2 and rotational speed $n_2$ at the output side of clutch 2, clutch 2 is completely engaged and internal combustion engine 9 drives vehicle 10.

By suitable compensation by electric motor 8 of clutch torques $M_2$, $M_1$ instantaneously transmitted by the clutches, engine torque $M_A$ may be adjusted accordingly to a predefined setpoint value during the entire starting process. The setpoint value may advantageously be set by the driver via a gas pedal or a driver assistance system.

When starting internal combustion engine 9, after clutch 3 is disengaged and while clutch 2 is in a slipping state, countershaft 12 is free of load. This may be utilized to engage a different gear on countershaft 12. Clutch 3 may thus be used another time during the starting operation, in that clutch 2 is disengaged again and clutch 3 further accelerates internal combustion engine 9 at the new gear ratio. It is thus also possible to engage a suitable gear on countershaft 12, which offers a favorable gear ratio to the started and driving internal combustion engine 9 for the acceleration ability of the vehicle. Since clutch 2 is disengaged again and the started internal combustion engine 9 is now driving the vehicle at a different gear ratio via clutch 3, it is therefore possible to enable a rapid response of the drive train to a setpoint value predefined by the driver.

In another embodiment, internal combustion engine 9 is cranked during electrical driving by bringing clutch 3 from the disengaged state into the slipping state. Clutch 3 is then disengaged again even before internal combustion engine 9 has reached its idling speed. Internal combustion engine 9 increases its rotational speed through combustions, i.e., by its own power. A gear is engaged on countershaft 11, this gear offering to started internal combustion engine 9 a favorable gear ratio for driving the vehicle by internal combustion engine 9. As soon as internal combustion engine 9 has reached a sufficiently high rotational speed so that $n_{2E}>n_2$, clutch 2 enters the slipping state, so that internal combustion engine 9 is driving the vehicle.

It is advantageous if gears which have been engaged while driving electrically are selected and readjusted based on the prevailing state of the drive train, so that favorable gear ratios prevail to start internal combustion engine 9. The engaged gears change with the prevailing state of the drive train. The prevailing state of the drive train results in particular from rotational speed $n_A$ of output shaft 13 and from engine torque $M_A$.

The method according to the present invention may also be used to advantage to link internal combustion engine 9 while driving electrically. Internal combustion engine 9 is cranked and accelerated by bringing clutches 2 and/or 3 from the disengaged state into the slipping state without any combustions occurring in internal combustion engine 9. This is expedient when driving on a gradient, for example, in order to utilize the drag torque of the non-combusting internal combustion engine 9 to decelerate the vehicle.

The method described here may also be used in hybrid drives, which include an internal combustion engine 9 on a drive axle and one or more other drive units, which may be electric motors 8 on another drive axle. The clutch torque or the starting torque is compensated through traction via the road surface. The compensation torque is also held low in this embodiment due to the favorable torque ratio during cranking of internal combustion engine 9. This also permits a corresponding start even when traction conditions are poor, such as wet or slippery roads.

What is claimed is:

1. A method for operating a hybrid vehicle, the method comprising:
bringing a first clutch, situated between at least one first drive unit and a second drive unit of the hybrid unit, from a disengaged state into a slipping state, wherein the second drive unit is started by at least one portion of the drive torque provided by the first drive unit; and
for starting the second drive unit, shifting at least two clutches into a slipping state, wherein the at least two clutches are situated between the first drive unit and the second drive unit.

2. The method of claim 1, wherein the at least two clutches are successively shifted into the slipping state.

3. The method of claim 1, wherein the at least two clutches are shifted sequentially superposed into the slipping state.

4. The method of claim 1, wherein the at least two clutches have different separate frictions.

5. The method of claim 4, wherein for cranking the second drive unit, the clutch currently having the lowest separate friction of the at least two clutches is operated in slipping mode and the second drive unit is accelerated.

6. The method of claim 5, wherein the first clutch, which is initially operated in slipping mode at the start of the second drive unit, does not accelerate the second drive unit up to its idling speed.

7. The method of claim 4, wherein the first clutch which is initially operated in slipping mode at the start of the second drive unit is disengaged again while the other clutch is operated in slipping mode.

8. The method of claim 1, wherein the first clutch, which is operated in slipping mode, is disengaged again at least partially from the slipping state on reaching the rotational speed equality between the input side and the output side of the clutch.

9. A method for operating a hybrid vehicle, the method comprising:
bringing a clutch, situated between at least one first drive unit and a second drive unit of the hybrid unit, from a disengaged state into a slipping state, wherein the second drive unit is started by at least one portion of the drive torque provided by the first drive unit; and
for starting the second drive unit, shifting at least two clutches into a slipping state wherein the first clutch, which is operated in slipping mode, is disengaged again at least partially from the slipping state on reaching the rotational speed equality between the input side and the output side of the clutch, and
wherein a rotational speed of the second drive unit is evaluated to detect the end of the start when the clutch is at least partially disengaged.

10. A method for operating a hybrid vehicle, the method comprising:
bringing a clutch, situated between at least one first drive unit and one second drive unit, from an engaged state into a slipping state, wherein the hybrid vehicle includes the at least one first drive unit and the one second drive unit, in which the second drive unit is stopped by at least one portion of the drive torque provided by the first drive unit; and
shifting at least two clutches into a slipping state to stop the second drive unit, wherein the at least two clutches are situated between the first drive unit and the second drive unit.

11. The method of claim 10, wherein the at least two clutches are shifted successively or sequentially superposed into the slipping state.

12. The method of claim 10, wherein after one clutch has been brought from the engaged state into a slipping or disengaged state, the clutch, which currently has the lowest separate friction of the at least two clutches and which brakes the second drive unit, is initially operated in slipping mode.

13. A device for operating a hybrid vehicle, comprising:
a first arrangement to bring a clutch, situated between at least one first drive unit and one second drive unit, from a disengaged state or an engaged state into a slipping state, wherein the hybrid vehicle includes the at least one first drive unit and the one second drive unit, in which the second drive unit is started or stopped by at least one portion of the drive torque provided by the first drive unit; and
a shifting arrangement to shift at least two clutches into a slipping state to start or stop the second drive unit, wherein the at least two clutches are situated between the first drive unit and the second drive unit.

14. The device of claim 13, wherein the first drive unit is situated on a first sub-transmission of a dual-clutch transmission having two sub-transmissions, and the second drive unit, which is to be started or stopped, is connected to an output of the hybrid vehicle via the dual-clutch transmission.

15. The device of claim 14, wherein the first drive unit and the second drive unit, the at least two clutches and a sensor which detects the rotational speed of the second drive unit are connected to a control unit for controlling the sequences of the clutches for a start or a stop of the second drive unit.

16. The device of claim 15, wherein the control unit is connected to a shift unit which varies the gear ratio of the clutch not operated in slipping mode, this shift unit being situated on at least one countershaft of each of the sub-transmissions.

17. The device of claim 13, wherein the first drive unit includes an electric motor and the second drive unit is an internal combustion engine.

* * * * *